US011662362B2

(12) United States Patent
Oltheten et al.

(10) Patent No.: US 11,662,362 B2
(45) Date of Patent: *May 30, 2023

(54) PITOT-STATIC SYSTEM BLOCKAGE DETECTOR

(71) Applicant: Textron Innovations Inc., Providence, RI (US)

(72) Inventors: Erik John Oltheten, Fort Worth, TX (US); Eric Walter Nottorf, Keller, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 49 days.

This patent is subject to a terminal disclaimer.

(21) Appl. No.: 17/347,528

(22) Filed: Jun. 14, 2021

(65) Prior Publication Data

US 2021/0302464 A1 Sep. 30, 2021

Related U.S. Application Data

(63) Continuation of application No. 16/129,173, filed on Sep. 12, 2018, now Pat. No. 11,035,877.

(51) Int. Cl.
*G01P 21/02* (2006.01)
*G01P 5/16* (2006.01)

(52) U.S. Cl.
CPC .............. *G01P 21/025* (2013.01); *G01P 5/16* (2013.01)

(58) Field of Classification Search
CPC .. G01P 21/025; G01P 5/16; G01P 5/00; G01P 15/006; G01P 3/26; G01P 5/02; G01L 27/007; F02D 2041/223
USPC ......................... 73/1.29, 1.57, 1.16, 37, 49.5
See application file for complete search history.

(56) References Cited

U.S. PATENT DOCUMENTS

2012/0123704 A1* 5/2012 Golly .................... G01P 21/025
702/50
2014/0156226 A1* 6/2014 Hashemian ............... G01P 5/16
702/183

* cited by examiner

*Primary Examiner* — Robert R Raevis
(74) *Attorney, Agent, or Firm* — Pramudji Law Group PLLC; Ari Pramudji

(57) ABSTRACT

Various implementation described herein are directed to a method for identifying a blockage in a pitot-static system. A pressure signal is received. Pressure fluctuations in the pressure signal are identified. A determination is made as to whether a blockage has occurred in the pitot-static system based on the identified pressure fluctuations.

20 Claims, 5 Drawing Sheets

PITOT-STATIC SYSTEM BLOCKAGE DETECTOR

CROSS-REFERENCE TO RELATED APPLICATIONS

This application is a continuation of patent application number U.S. Ser. No. 16/129,173, filed 2018 Sep. 12, and the entire disclosure of which is incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Pitot/static systems are used to support airspeed indications and can cause misleading airspeed indications when the pitot tube is blocked by foreign objects or by ice build-up. Normally, the air pressure experienced by the pitot tube is a total of the outside ambient air pressure (referred to as static pressure) and the dynamic pressure due to forward flight. A static port is used to measure static pressure independently, and the measured pressure is subtracted from the total pressure measured at the pitot tube to provide the resulting dynamic pressure which is then scaled to indicate airspeed. A typical pitot tube includes a pressure chamber which often includes a small drain hole to allow accumulated water to exit. If a blockage in the pitot tube occurs upstream of a drain hole, the fault is apparent because the air pressure normally provided by forward flight is first trapped and then leaks through the drain until pressure is near equal to the static port. This produces a loss of airspeed indication that is readily apparent. However, in the case of a blockage that includes the drain hole (as would be the typical case in icing conditions), or a blockage that occurs downstream of the drain, the blockage traps the air under pressure in the pitot system holding the airspeed reading at the time the blockage occurred. When this type of blockage occurs, the condition is not apparent. Subsequent airspeed changes are not indicated correctly. Furthermore if the altitude increases after blockage occurs, the airspeed indication increases, and if the altitude decreases, the indicated airspeed decreases. These misleading indications can cause confusion for the flight crew and can lead to inappropriate action. This can also cause a flight control computer or coupled autopilot to go "open loop" if the system autopilot attempts to correct a perceived error between indicated and target airspeed.

Similarly, a blockage of the static port system is typically not apparent due to the trapped air pressure within the system. In this case the altitude indication does not change in response to changes in altitude. Furthermore an increase in altitude will cause a decrease in airspeed reading from the actual airspeed, and a decrease in altitude will cause an increase in airspeed reading from the actual airspeed.

Traditionally, multiple pitot/static systems are used in large aircraft and automatic comparisons are performed between readings to detect the errors caused by blockages. Smaller aircraft with a single airspeed indicating system still rely on pilot skill in recognizing a blocked pitot tube or static port condition.

SUMMARY

Described herein are various implementations of a method for identifying a blockage in a pitot-static system. In one implementation, a pressure signal is received. Pressure fluctuations in the pressure signal are identified. A determination is made as to whether a blockage has occurred in the pitot-static system based on the identified pressure fluctuations.

In one implementation, the pressure signal may include a total pressure signal received from a total pressure sensor. The total pressure sensor may be coupled to a pitot tube of the pitot-static system. A predefined airspeed may be attained prior to receiving the pressure signal.

In one implementation, the pressure signal may include a static pressure signal. The static pressure signal may be received from a static pressure sensor. The static pressure sensor may be coupled to a static port of the pitot-static system. A predefined flight range of a rotor speed may be attained prior to receiving the pressure signal.

The identified pressure fluctuations may include a noise component. In one implementation, the noise component may be a rotor blade passage frequency. In another implementation, the noise component may be a longitudinal vibration frequency.

In one implementation, the identified pressure fluctuations may be isolated to identify pressure fluctuations characteristic of an open port.

In one implementation, the determination of whether the blockage has occurred may be processed in a frequency domain.

In one implementation, the determination of whether the blockage has occurred may be processed in a time domain.

In one implementation, the blockage may be indicated based on a threshold.

Described herein is an apparatus for identifying a blockage in a pitot-static system. In one implementation, the apparatus includes a device configured to: receive a pressure signal; identify pressure fluctuations in the pressure signal; and determine whether a blockage has occurred in the pitot-static system based on the identified pressure fluctuations.

In one implementation, the device receives the pressure signal from a pressure sensor of the pitot-static system coupled to the device. The pressure sensor coupled to the device may be a total pressure sensor. The pressure sensor coupled to the device may be a static pressure sensor.

Described herein is a blockage detector for identifying a blockage in a pitot-static system. In one implementation, the blockage detector includes a pressure sensor. The blockage detector further includes a circuit that: receives a pressure signal from the pressure sensor; identifies pressure fluctuations in the pressure signal; and determines whether a blockage has occurred in the pitot-static system based on the identified pressure fluctuations.

The above referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
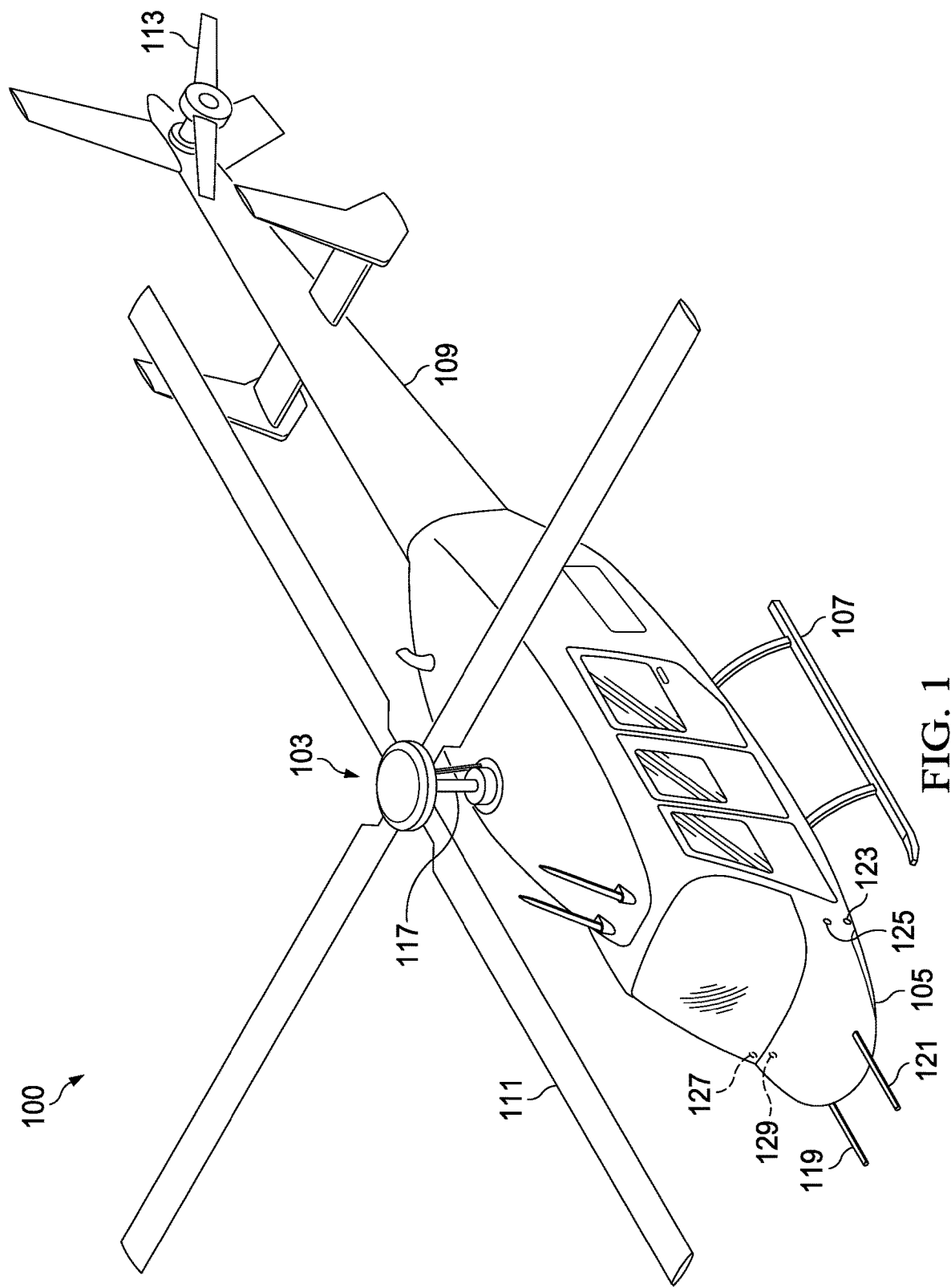
FIG. 1 illustrates a rotorcraft in accordance with implementations of various techniques described herein.

Rotorcraft have specific characteristics that normally present challenges related to providing stable airspeed indication. At low speed, rotor wash creates variations in pressure that occur as each blade passes the pitot and static system. This creates pressure pulses at each port at or near the blade passage frequency. At higher speeds, where rotor wash moves rearward away from the pitot tube, the airframe remains subject to longitudinal vibration. This longitudinal vibration is primarily made up of multitudes of the main rotor frequencies. The variations in pressure and the longitudinal vibration translate into nuisance noise in the airspeed system. This nuisance noise is typically filtered and removed in order to provide stable air data parameters that are suitable for presentation on flight displays to the pilot and for use by flight control systems. The nuisance signals related to rotorcraft dynamics can be utilized as a way to detect that the pitot tube and static port are open to the outside atmosphere and are not blocked. If a pitot tube or static port were to become blocked, e.g., by ice or a foreign object, the pressure value detected becomes a clean and relatively constant signal, possibly slowly changing due to equalization, but devoid of the nuisance characteristics typical of helicopter air data systems.

Implementations of the present disclosure monitor the total pressure value or the static pressure value at a point in the system prior to the application of low-pass filtering to remove the nuisance characteristics. Typically Air Data Computers (ADCs) provide minimal filtering so that downstream systems such as flight display systems and flight control computers can provide parameter filtering specific to their needs. As such, implementations of the present disclosure may be included in a variety of hosting systems coupled either pneumatically or electrically to air data signals typically available in a rotorcraft. In order to determine a pitot tube blockage, the total pressure value may be determined using air data computer, a stand-alone pressure detector circuit, or similar devices. Total pressure is the air pressure experienced by the pitot tube without the effects of the static pressure removed. The total pressure signal is then either high-pass or notch filtered in order to remove the basic pressure data and retain only the "nuisance noise components" that include rotor wash and longitudinal vibration frequencies. If the resulting signal exceeds a threshold that indicates the minimum noise component signal for a normal open pitot tube, the pitot tube is determined to be operating normally. If the noise component is below a threshold, then the system is determined to be blocked and the blockage is indicated to the pilot via a display system or indicator. In one implementation, the detection system may be activated upon reaching a minimum airspeed and/or a minimum rotor revolutions per minute (RPM) reading. The threshold for the noise component may be tailored as a function of the indicated airspeed and as such, provides an ability to refine the threshold as necessary.

Implementations for determining static port blockage operate similarly, however, the effect of multi-port systems is also considered. Static systems often include two cross-connected ports in each system specifically intended to reduce errors caused by sideways flight and also to significantly reduce the effects of rotor-wash at low speed. A single port blockage has the effect of increasing the nuisance components, while a total blockage causes the relatively clean signal similar to a blocked pitot. Therefore a range of a noise component signal as a function of airspeed, isolated by high-pass or notch filtering will indicate a properly operating static port system. A resulting signal below a specific threshold indicates a blocked system, but a signal above a threshold may be used to indicate a developing or partial blockage. For static port detection systems a mechanism may be included to prevent false alarms for when the aircraft is stationary prior to rotors turning, i.e., when the nuisance noise component is not present. Minimum airspeed and/or rotor RPM are parameters that can be used to prevent false alarms. Implementations of the present disclosure can be: included within a traditional air data computer or similar devices; built into systems that monitor total pressure and static pressure reported by an air data computer or similar devices, such as flight control systems, flight display systems, or ancillary accessories; or built into dedicated equipment monitoring the pneumatic tubing associated with a pitot or static system.

FIG. 1 illustrates a rotorcraft 100 according to one implementation. Rotorcraft 100 has a rotor system 103 with a plurality of main rotor blades 111. Rotorcraft 100 further includes a fuselage 105, landing gear 107, a tail member 109, and tail rotor blades 113. An engine (not shown) supplies torque to a main rotor mast 117 to rotate main rotor blades 111. The engine also supplies torque to a tail rotor drive shaft (not shown) to rotate tail rotor blades 113. The pitch of each main rotor blade 111 can be selectively controlled in order to selectively control direction, thrust, and lift of rotorcraft 100. Further, the pitch of tail rotor blades 113 can be selectively controlled in order to selectively control yaw of rotorcraft 100.

Rotorcraft 100 includes one or more pitot tubes 119, 121. Rotorcraft 100 also includes one or more static pressure ports 123, 125, 127, 129 on a left side (left static pressure ports 123, 125) and a right side (right static pressure ports 127, 129) of rotorcraft 100.

Pitot tubes 119, 121 and static pressure ports 123, 125, 127, 129 may be part of a pitot-static system. The pitot-static system may include a system of pressure-sensitive instruments that is most often used in aviation to determine an airspeed, altitude, and altitude trend of rotorcraft 100. A pitot-static system generally includes at least one pitot tube, at least one static port. Other elements that may be connected are air data computers, flight data recorders, altitude encoders, cabin pressurization controllers, and various accessories.

Rotorcraft 100 is illustrated for exemplary purposes. It should be appreciated that implementations of the present disclosure may be used on aircraft other than rotorcraft, e.g., airplanes, tilt rotors, or unmanned aircraft. Further, implementations of the present disclosure may be used on non-aircraft vehicles.

Figure 2:
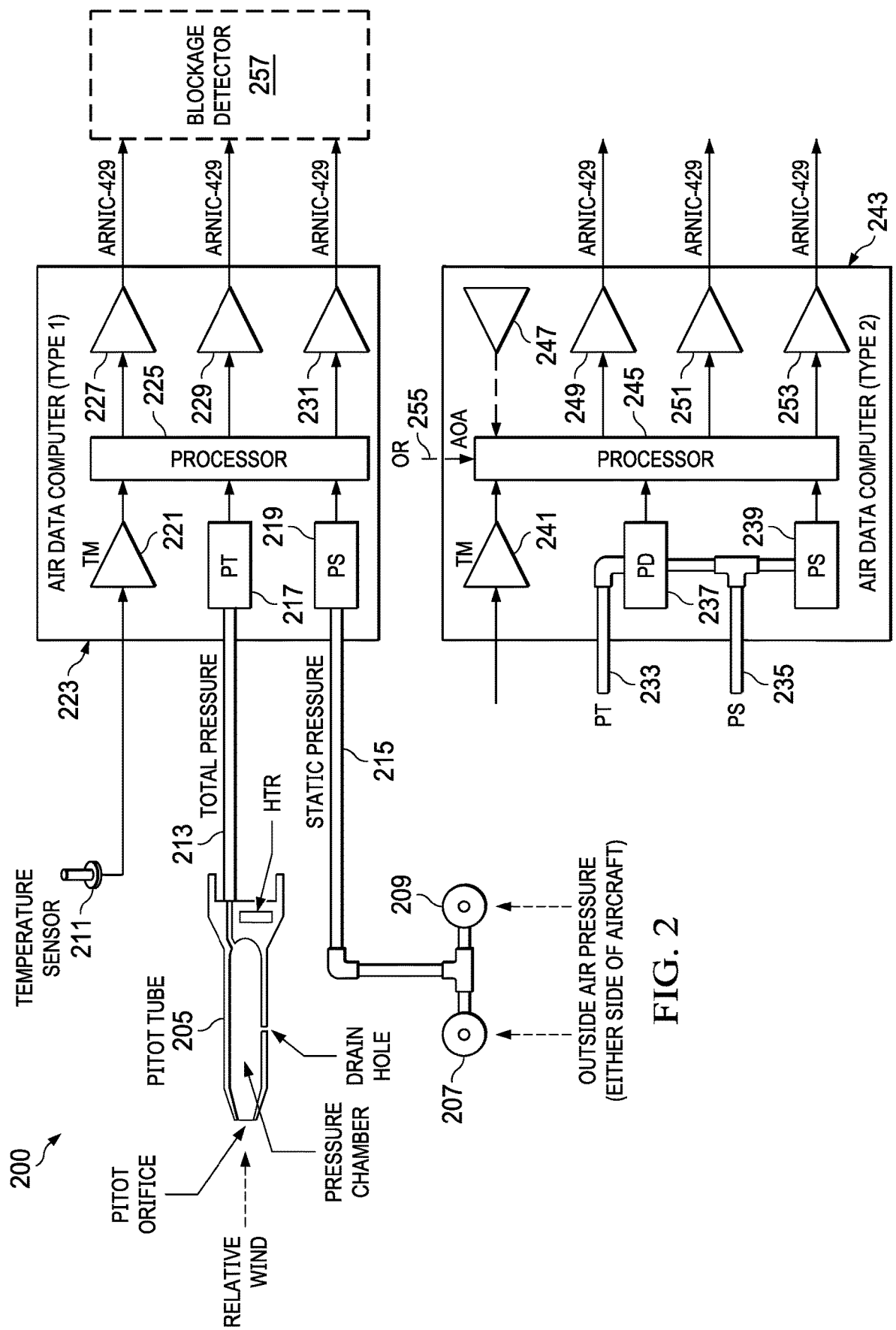
FIG. 2 illustrates an example of a pitot-static system in accordance with implementations of various techniques described herein.

FIG. 2 illustrates an example of a pitot-static system 200. Pitot-static system 200 may include pitot tube 205, static pressure ports 207, 209, pneumatic lines 213, 215 and an air data computer (ADC) 223. Pitot tube 205 may include a pitot orifice, a pressure chamber, a drain hole and heater (HTR). Pressure readings can be determined from relative wind entering the pressure chamber through the pitot orifice.

A total pressure line 213 couples the pitot tube 205 to total pressure sensor 217 of ADC 223. A static pressure line 215 couples the static pressure ports 207, 209 to static pressure sensor 219 of ADC 223. An air temperature reading may be provided from temperature element 211 to temperature sensor 221 of ADC 223. ADC 223 includes a processor 225 that receives input from various sensors (e.g., sensors 217, 219, 221) and determines various ADC parameters. The ADC 223 may provide the various ADC parameters to various aircraft systems using data transfer ports 227, 229, 231.

In one implementation, the data transfer ports may be Aeronautical Radio Inc. (ARINC) 429 standard ports. ARINC 429 is a data transfer standard for aircraft avionics. ARINC 429 uses a self-clocking, self-synchronizing data bus protocol (transmit and receive are on separate ports). The physical connection wires for each port are twisted pairs carrying balanced differential signaling. The ADC parameters may include: calibrated airspeed, true airspeed, corrected altitude, pressure altitude, density altitude, vertical speed, static air temperature, total pressure, dynamic pressure, static pressure, Mach number, and angle of attack. The various user aircraft systems may include: flight displays, flight control systems, and flight navigation systems.

Pitot static system 200 may use a second type of ADC (ADC 243) that is configured to work with a dynamic pressure sensor (dynamic pressure sensor 237). In this implementation, a total pressure line 233 couples the pitot tube 205 to dynamic pressure sensor 237 of ADC 243. A static pressure line 235 couples the static pressure ports 207, 209 to static pressure sensor 239 of ADC 243. Pressure data from the dynamic sensor can be converted to total pressure data by ADC 243 using static pressure data from static pressure sensor 239. An air temperature reading may be provided from temperature element 211 to temperature sensor 241 of ADC 243. ADC 243 includes a processor 245 that receives input from various sensors (e.g., sensors 237, 239, 241) and determines various ADC parameters. Processor 245 may also receive data from miscellaneous input/sensor 247 and angle of attack (AOA) data from AOA sensor 255. The ADC 243 may provide the various ADC parameters to various aircraft systems using data transfer ports 249, 251, 253.

ADC 243 can be used to detect a pitot tube blockage and/or a static port blockage. Although implementations described herein refer to ADC 243, other systems can be used to determine pitot tube and static port blockages. Processing for blockage detection can also be performed in systems that have access to air data computer digital outputs, e.g., via a separate blockage detector 257 implemented in a display system, automatic flight control system, navigation system, or a dedicated system monitoring the digital data.

ADC 243 uses the "total pressure" parameter to monitor for pitot blockages. In one implementation, prior to initiation of pitot tube blockage monitoring, a minimum airspeed should be attained. In one implementation, pitot tube monitoring is initiated when the airspeed is greater than or equal to 30 knots.

ADC 243 uses the "static pressure" parameter to monitor for static port blockages. In one implementation, prior to initiation of static port blockage monitoring, a rotor speed should be within a flight range.

Noise components of the total pressure and/or static pressure parameters may be calculated by the ADC 223, 243. These noise components may include a rotor blade passage frequency and a longitudinal vibration frequency. When the noise components exceed a threshold that indicates a normal open pitot tube, the system is determined to be operating normally. When the noise component is below a threshold, then the system is determined to be blocked and an indication of the blockage is provided to the pilot via a display system or other audio and/or visual indicator.

In one implementation, blockage detection for pitot tubes and static ports may be processed in the frequency domain. The parameter data (e.g., total pressure and/or static pressure) can be high-pass filtered or notch filtered to isolate the frequency range of interest. The isolated frequency range of interest may be applied to noise components of the total pressure and/or static pressure data. These noise components may include rotor blade passage frequency and longitudinal vibration frequency.

A mean amplitude of the resulting output (e.g., the noise components) of the high-pass filter or notch filter may be detected and provided as output. If the output is above a threshold, the blockage detector indicates that the pneumatic line is not blocked and is working normally. If the output of the high-pass filter or notch filter remains below the threshold for a period of time, the pneumatic line is considered blocked. In one implementation, the threshold is determined by a flight test. In one implementation, the period of time used to determine whether a blockage has occurred is approximately 2 to 3 seconds.

In one implementation, blockage detection for pitot tubes and static ports may be processed in the time domain. A series of samples of the pressure (total pressure and/or static pressure) data corresponding to at least two rotor blade passages can be periodically captured. A difference between the maximum value and minimum value sample in the captured data can be determined. If the difference is above a threshold, the blockage detector indicates the pneumatic line is not blocked. If the difference is below a threshold, then the blockage detector indicates the pneumatic line is potentially blocked. In one implementation, the threshold can be determined by a flight test. In one implementation, the threshold may vary as a function of altitude.

In one implementation, after a predefined number of these samples/checks in sequence indicating a potential blockage in the pitot tube and/or static port, the blockage detection system will indicate a blockage. In one implementation, once a blockage is indicated, a predefined number of these samples/checks indicating that the pitot tube and/or static port is not blocked would cause the system to indicate no blockage.

Figure 3:
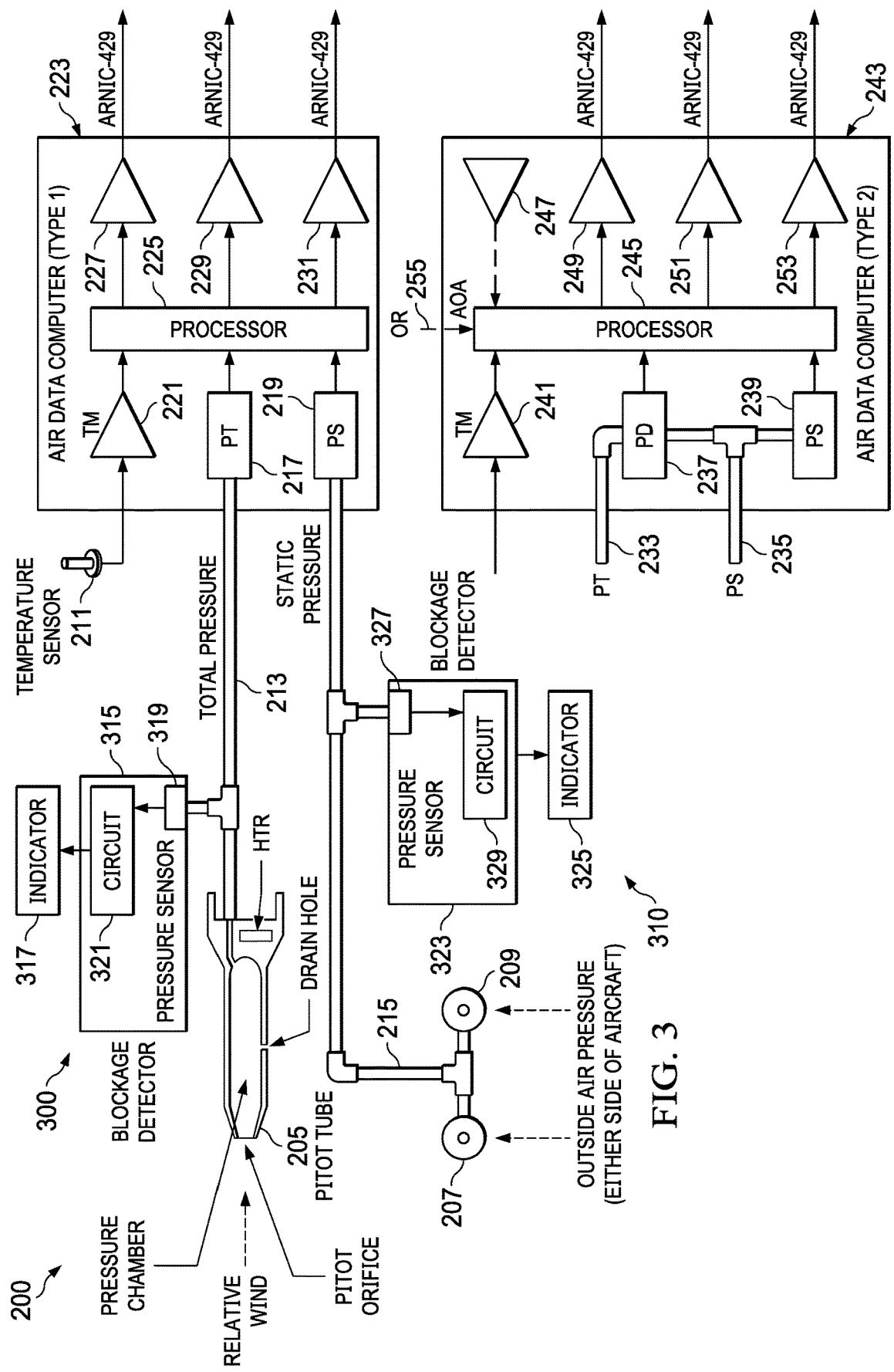
FIG. 3 illustrates an example of a pitot-static system in accordance with implementations of various techniques described herein.

Pitot static system 200 may be used to detect a blockage in pitot tube 205 and/or static ports 207, 209 using a standalone circuit. FIG. 3 illustrates an example of a pitot static system using a standalone circuit (e.g., blockage detector 300, 305) to detect a blockage in pitot tube 205 and/or static pressure ports 207, 209. Blockage detector 300 is incorporated as a dedicated blockage detector coupled to total pressure line 213, 233. Blockage detector 305 is incorporated as a dedicated blockage detector coupled to static pressure line 215, 235. Blockage detector 300, 305 may be configured to work with ADC 223, 243 or with traditional pneumatic instruments. Each blockage detector 300, 305 includes a blockage detector circuit 321, 329 and a pressure sensor coupled to a respective pressure line 213, 215, 233, 235. The blockage detector 300, 305 receives pressure readings from sensor 319, 327. The circuit 321, 329 determines whether a blockage has occurred based on a noise component of the received pressure readings. When the circuit 321, 329 determines that a blockage has occurred, circuit 321, 329 provides an indication of the blockage to the pilot via indicator 317, 325. Indicator 317, 325 may be provided via a display system or some other audio and/or visual indicator.

Figure 4:
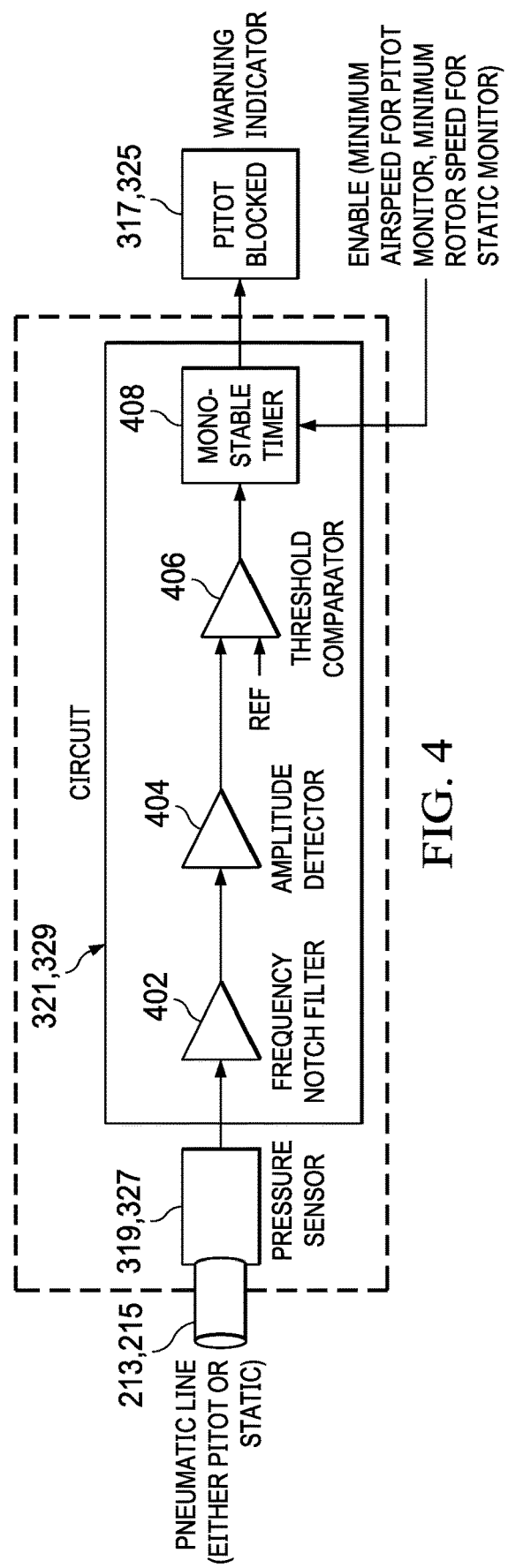
FIG. 4 illustrates an analog implementation of a blockage detector circuit in accordance with implementations of various techniques described herein.

FIG. 4 illustrates an analog implementation of a blockage detector circuit, e.g., blockage detector circuit 321, 329. In this implementation, pressure sensor 319, 327 of blockage detector circuit 321, 329 is coupled to pneumatic line 213, 215. Pressure sensor 319, 327 is coupled to circuit 321, 329. When a blockage is detected by circuit 321, 329, an indication is provided to indicator 317, 325. Circuit 321, 329 includes a frequency notch filter 402, amplitude detector 404, threshold comparator 406 and a monostable timer 408.

Notch filter 402 can be tuned to pass signals in a frequency range that includes rotor blade frequency and major in-flight longitudinal vibration frequencies. Amplitude detector 404 converts the result of the notch filter 402 to a DC signal proportional to the amplitude of the oscillations within the frequency of interest. Threshold comparator 406 determines whether the signal amplitude meets the minimum criteria (REF) to establish that the port to the pneumatic line is open. If the minimum criteria is met, threshold comparator 406 applies a signal that prevents the monostable timer from indicating a blockage. If the signal drops below the threshold (e.g., the minimum criteria) and remains there for a period of time determined by the timer 408, the timer activates the warning indicator 317, 325.

In one implementation, the enable signal (ENABLE) is used to prevent false blockage alerts when the helicopter rotors are not turning or the aircraft is not in forward flight. The enable signal (ENABLE) may be based on airspeed in the case of a pitot blockage monitor/detector. The enable signal may be based on rotor speed in the case of a static port blockage monitor/detector.

Figure 5:
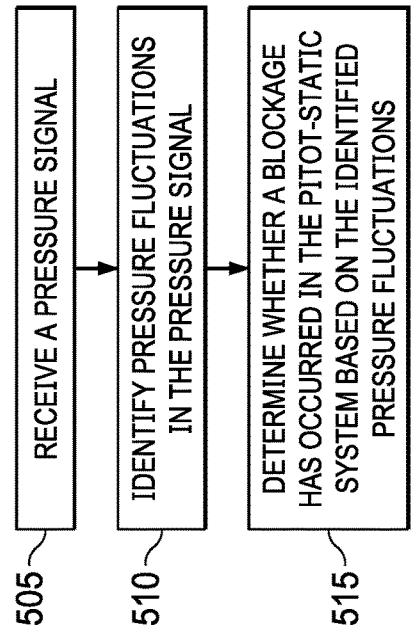
FIG. 5 illustrates a diagram of a method for identifying a blockage in a pitot-static system in accordance with implementations of various techniques described herein.

FIG. 5 illustrates a block diagram of a method for identifying a blockage in a pitot-static system. At block 505 a pressure signal is received. The pressure signal may be received by, for example ADC 243 or any other system having a blockage detector, e.g., blockage detector 257, 300, 305, capable of processing a pressure signal to identify a blockage.

In one implementation, the pressure signal is a total pressure signal/parameter that is used to monitor for pitot blockages. In one implementation, prior to initiation of pitot tube blockage monitoring, a minimum or predefined airspeed should be attained. In one implementation, pitot tube monitoring is initiated when the airspeed is greater than or equal to 30 knots.

In one implementation, the pressure signal is a static pressure signal/parameter that is used to monitor for static port blockages. In one implementation, prior to initiation of static port blockage monitoring, a rotor speed should be within a predefined flight range.

At block 510, pressure fluctuations are identified in the pressure signal. In one implementation, the pressure fluctuations may be noise components, oscillation components and/or transient components. Noise components of the total pressure and/or static pressure parameters may be determined by the ADC 223, 243. These noise components may include a rotor blade passage frequency and a longitudinal vibration frequency.

At block 515, a determination is made as to whether a blockage has occurred based on the identified pressure fluctuations. When the pressure fluctuations exceed a threshold that indicates a normal open pitot tube or static port, the system is determined to be operating normally. When the pressure fluctuation is below a threshold, the system is determined to be blocked and an indication of the blockage is provided to the pilot via a display system or other audio and/or visual indicator.

In one implementation, blockage detection for pitot tubes and static ports may be processed in the frequency domain. The parameter data (e.g., total pressure and/or static pressure) can be high-pass filtered or notch filtered to isolate the frequency range of interest. The isolated frequency range of interest may be applied to determine pressure fluctuations of the total pressure and/or static pressure data. These pressure fluctuations may include rotor blade passage frequency and longitudinal vibration frequency.

A mean amplitude of the resulting output (e.g., the pressure fluctuations) of the high-pass filter or notch filter may be detected and provided as output. If the output is above a threshold, the blockage detector indicates that the pneumatic line is not blocked and is working normally. If the output of the high-pass filter or notch filter remains below the threshold for a period of time, the pneumatic line is considered blocked. In one implementation, the threshold is determined by a flight test. In one implementation, the period of time used to determine whether a blockage has occurred is approximately 2 to 3 seconds.

In one implementation, blockage detection for pitot tubes and static ports may be processed in the time domain. A series of samples of the pressure (total pressure and/or static pressure) data corresponding to at least two rotor blade passages can be periodically captured. A difference between the maximum value and minimum value sample in the captured data can be determined. If the difference is above a threshold the blockage detector indicates that the pneumatic line is not blocked. If the difference is below a threshold then the pneumatic line is potentially blocked. In one implementation, the threshold can be determined by a flight test. In one implementation, the threshold may vary as a function of altitude.

In one implementation, after a predefined number of these samples/checks in sequence indicating a potential blockage in the pitot tube and/or static port, the blockage detection system will indicate a blockage. In one implementation, once a blockage is indicated, a predefined number of these samples/checks indicating that the pitot tube and/or static port is not blocked would cause the system to indicate no blockage.

Figure 6:
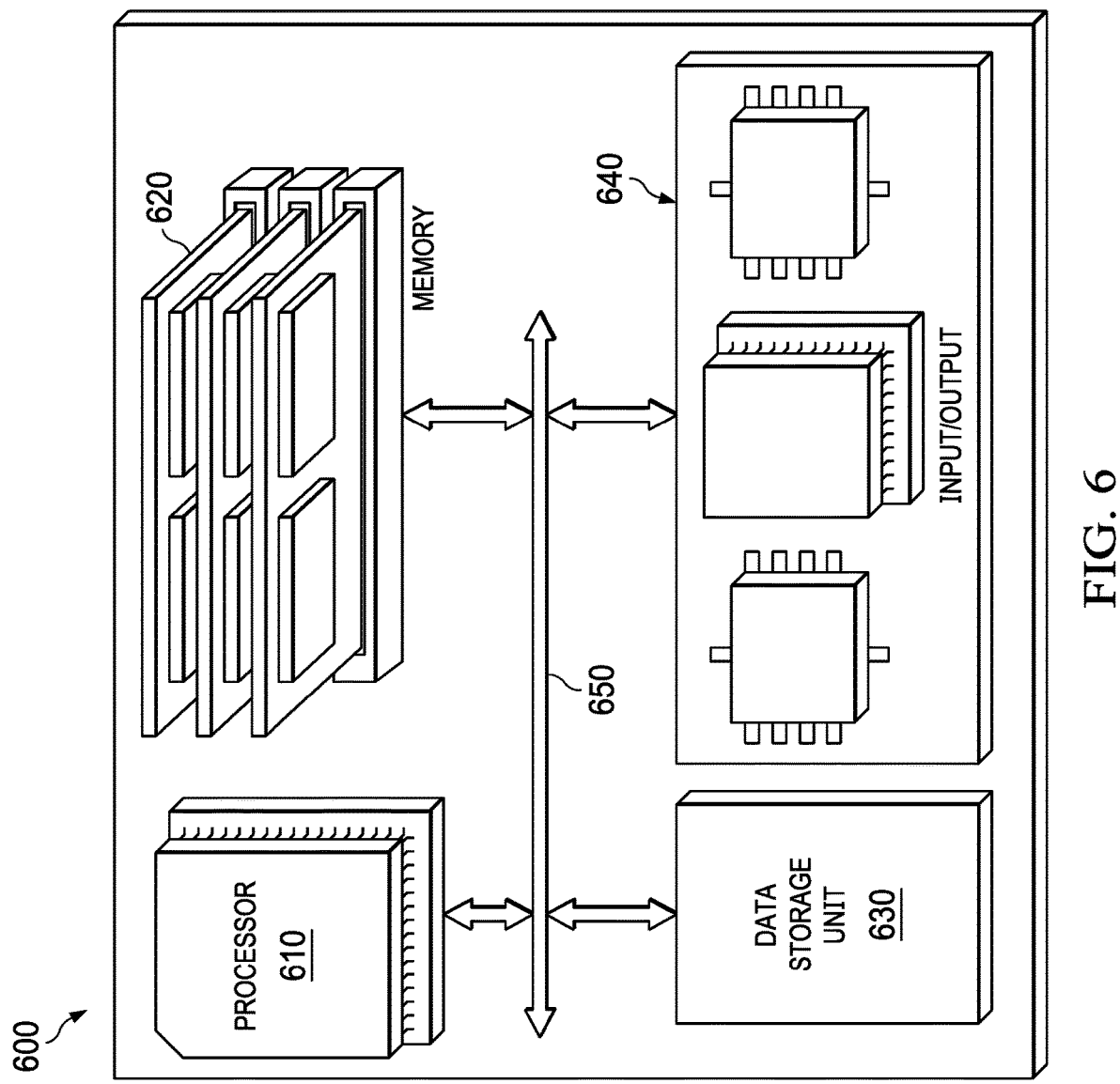
FIG. 6 illustrates a computing system in accordance with implementations of various techniques described herein.

FIG. 6 is a block diagram of a hardware configuration 600 operable to identify a blockage in a pitot-static system. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device/drive, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more pitot-static system interfaces, sensors and/or data transfer ports.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying a blockage in a pitot-static system, comprising:
   receiving a signal indicative of a pressure value;
   identifying fluctuations in the signal;
   isolating a frequency from the identified fluctuations, via a notch filter configured to pass signals in a frequency range that includes in-flight longitudinal vibration frequencies; and
   determining whether a blockage has occurred in the pitot-static system based on the identified fluctuations.

2. The method of claim 1, wherein the pressure value comprises a total pressure value, and the signal is received from a total pressure sensor.

3. The method of claim 2, wherein the total sensor is coupled to a pitot tube of the pitot-static system.

4. The method of claim 3, wherein a predefined airspeed is attained prior to receiving the signal.

5. The method of claim 1, wherein the signal comprises a static pressure signal.

6. The method of claim 5, wherein the static pressure signal is received from a static pressure sensor.

7. The method of claim 6, wherein the static pressure sensor is coupled to a static port of the pitot-static system.

8. The method of claim 7, wherein a predefined flight range of a rotor speed is attained prior to receiving the signal.

9. The method of claim 1, wherein the identified fluctuations comprise a noise component.

10. The method of claim 9, wherein the noise component comprises the rotor blade passage frequency.

11. The method of claim 9, wherein the noise component comprises the in-flight longitudinal vibration frequencies.

12. The method of claim 1, further comprising: isolating the identified fluctuations to identify fluctuations characteristic of an open port.

13. The method of claim 1, wherein the determination of whether the blockage has occurred is processed in a frequency domain.

14. The method of claim 1, wherein the determination of whether the blockage has occurred is processed in a time domain.

15. The method of claim 1, wherein the blockage is indicated based on a threshold.

16. An apparatus for identifying a blockage in a pitot-static system, comprising:
    a device configured to: receive a signal indicative of a pressure value;
    identify fluctuations in the signal;
    isolate a frequency from the identified fluctuations via a notch filter configured to pass signals in a frequency range that includes in-flight longitudinal vibration frequencies; and
    determine whether a blockage has occurred in the pitot-static system based on the identified fluctuations.

17. The apparatus of claim 16, wherein the device is further configured to: receive the signal from a sensor of the pitot-static system coupled to the device.

18. The apparatus of claim 17, wherein the sensor coupled to the device comprises a total pressure sensor.

19. The apparatus of claim 18, wherein the sensor coupled to the device comprises a static pressure sensor.

20. A blockage detector for identifying a blockage in a pitot-static system, comprising:
    a sensor; and
    a circuit that:
    receives from the sensor a signal indicative of a pressure value;
    identifies fluctuations in the signal;
    isolates a frequency from the identified fluctuations via a notch filter configured to pass signals in a frequency range that includes in-flight longitudinal vibration frequencies; and
    determines whether a blockage has occurred in the pitot-static system based on the identified fluctuations.

* * * * *